US012621632B2

(12) United States Patent (10) Patent No.: US 12,621,632 B2
Jensen (45) Date of Patent: May 5, 2026

(54) NO SERVICE EMERGENCY LOCATE FOR NETWORK COVERAGE

(71) Applicant: T-MOBILE INNOVATIONS LLC, Overland Park, KS (US)

(72) Inventor: Daniel C. Jensen, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 275 days.

(21) Appl. No.: 18/378,455

(22) Filed: Oct. 10, 2023

(65) Prior Publication Data

US 2025/0119706 A1      Apr. 10, 2025

(51) Int. Cl.
*H04W 4/024* (2018.01)
*H04W 4/90* (2018.01)
*H04W 64/00* (2009.01)
*H04W 8/02* (2009.01)

(52) U.S. Cl.
CPC ............. *H04W 4/024* (2018.02); *H04W 4/90* (2018.02); *H04W 64/003* (2013.01); *H04W 8/02* (2013.01)

(58) Field of Classification Search
CPC ......... H04W 4/024; H04W 4/90; H04W 8/02; H04W 64/003
USPC ...................................................... 455/456.1
See application file for complete search history.

(56) References Cited

U.S. PATENT DOCUMENTS

| | | | | |
|---|---|---|---|---|
| 8,073,441 | B1 * | 12/2011 | Unger ................... | H04W 48/18 |
| | | | | 455/435.2 |
| 8,644,818 | B1 * | 2/2014 | Okmyanskiy ....... | H04W 64/003 |
| | | | | 455/456.6 |
| 10,517,105 | B1 * | 12/2019 | Prabhakar ......... | H04M 15/8033 |
| 11,368,211 | B1 * | 6/2022 | Boyapati ............... | G06N 10/00 |
| 2006/0019659 | A1 * | 1/2006 | Rosenberg ........... | H04W 60/00 |
| | | | | 455/432.1 |
| 2012/0040693 | A1 * | 2/2012 | Wigren ............... | G01S 5/02525 |
| | | | | 455/456.1 |
| 2013/0210425 | A1 * | 8/2013 | Nagaraj ................ | H04W 84/12 |
| | | | | 455/432.1 |
| 2014/0099945 | A1 * | 4/2014 | Singh ................... | H04W 48/18 |
| | | | | 455/432.1 |
| 2014/0274035 | A1 * | 9/2014 | Unger ................... | H04W 76/18 |
| | | | | 455/432.1 |
| 2014/0323150 | A1 * | 10/2014 | Mangold ............... | H04W 4/029 |
| | | | | 455/456.1 |
| 2019/0223247 | A1 * | 7/2019 | Kang .................... | H04L 1/1867 |
| 2020/0336982 | A1 * | 10/2020 | Asterjadhi ........ | H04W 52/0229 |
| 2020/0374834 | A1 * | 11/2020 | Sun ........................ | H04W 68/02 |
| 2021/0136585 | A1 * | 5/2021 | Rosberg ............... | H04W 64/00 |
| 2022/0286197 | A1 * | 9/2022 | Boyapati .................. | H04B 7/17 |
| 2022/0369067 | A1 * | 11/2022 | Chen .................... | H04W 4/029 |

(Continued)

*Primary Examiner* — Jean A Gelin
(74) *Attorney, Agent, or Firm* — SHOOK, HARDY & BACON L.L.P.

(57) ABSTRACT

Aspects herein provide a system, media, and methods for/of an application that utilizes collected telecommunication data, to accurately identify directions from a UE to a nearest coverage area. In aspects, the technology assists a user (i.e., subscriber) by navigating the user, via a UE, to a geolocation that includes some type of wireless cellular coverage, for example, through a telecommunications carrier, a roaming carrier, and/or an emergency carrier. If the user is currently and physically located in an area with no coverage, the system will generate a map on the user's device showing a distance and a direction to the nearest coverage area.

18 Claims, 8 Drawing Sheets

300

DETERMINE THAT A USER DEVICE IS AT A LOCATION THAT IS OUTSIDE A COVERAGE AREA PROVIDED BY A HOME CARRIER ~310

DETERMINE AN ABSENCE OF ANY ROAMING CARRIERS TO PROVIDE COVERAGE TO THE USER DEVICE AT THE LOCATION ~320

DETERMINE A PRECISE LOCATION OF THE USER DEVICE ~330

USING THE PRECISE LOCATION, DETERMINE A DISTANCE FROM THE USER DEVICE TO A LOCATION WHERE COVERAGE IS PROVIDED ~340

(56) References Cited

U.S. PATENT DOCUMENTS

| | | | |
|---|---|---|---|
| 2023/0025797 A1* | 1/2023 | Lee | H04W 4/40 |
| 2023/0403761 A1* | 12/2023 | Menon | H04W 4/029 |
| 2024/0284528 A1* | 8/2024 | Fischer | H04L 5/0051 |
| 2025/0016720 A1* | 1/2025 | Manolakos | H04W 64/00 |
| 2025/0203497 A1* | 6/2025 | Velev | H04L 67/53 |

* cited by examiner

300

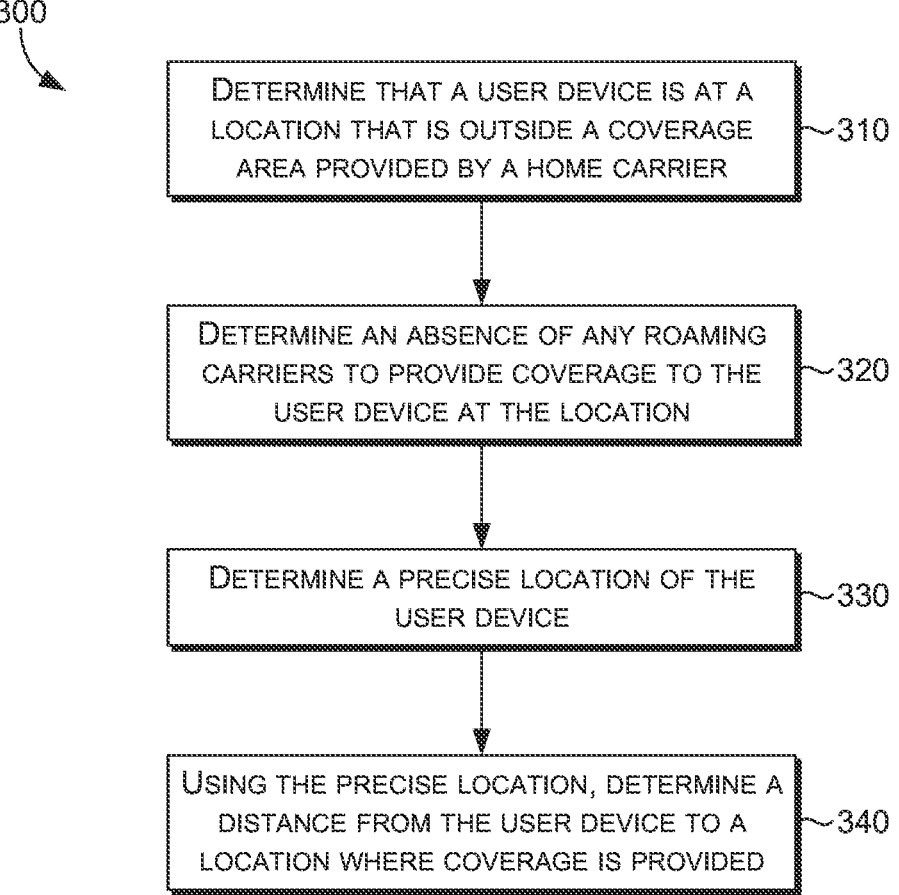

DETERMINE THAT A USER DEVICE IS AT A LOCATION THAT IS OUTSIDE A COVERAGE AREA PROVIDED BY A HOME CARRIER ~310

DETERMINE AN ABSENCE OF ANY ROAMING CARRIERS TO PROVIDE COVERAGE TO THE USER DEVICE AT THE LOCATION ~320

DETERMINE A PRECISE LOCATION OF THE USER DEVICE ~330

USING THE PRECISE LOCATION, DETERMINE A DISTANCE FROM THE USER DEVICE TO A LOCATION WHERE COVERAGE IS PROVIDED ~340

*FIG. 3*

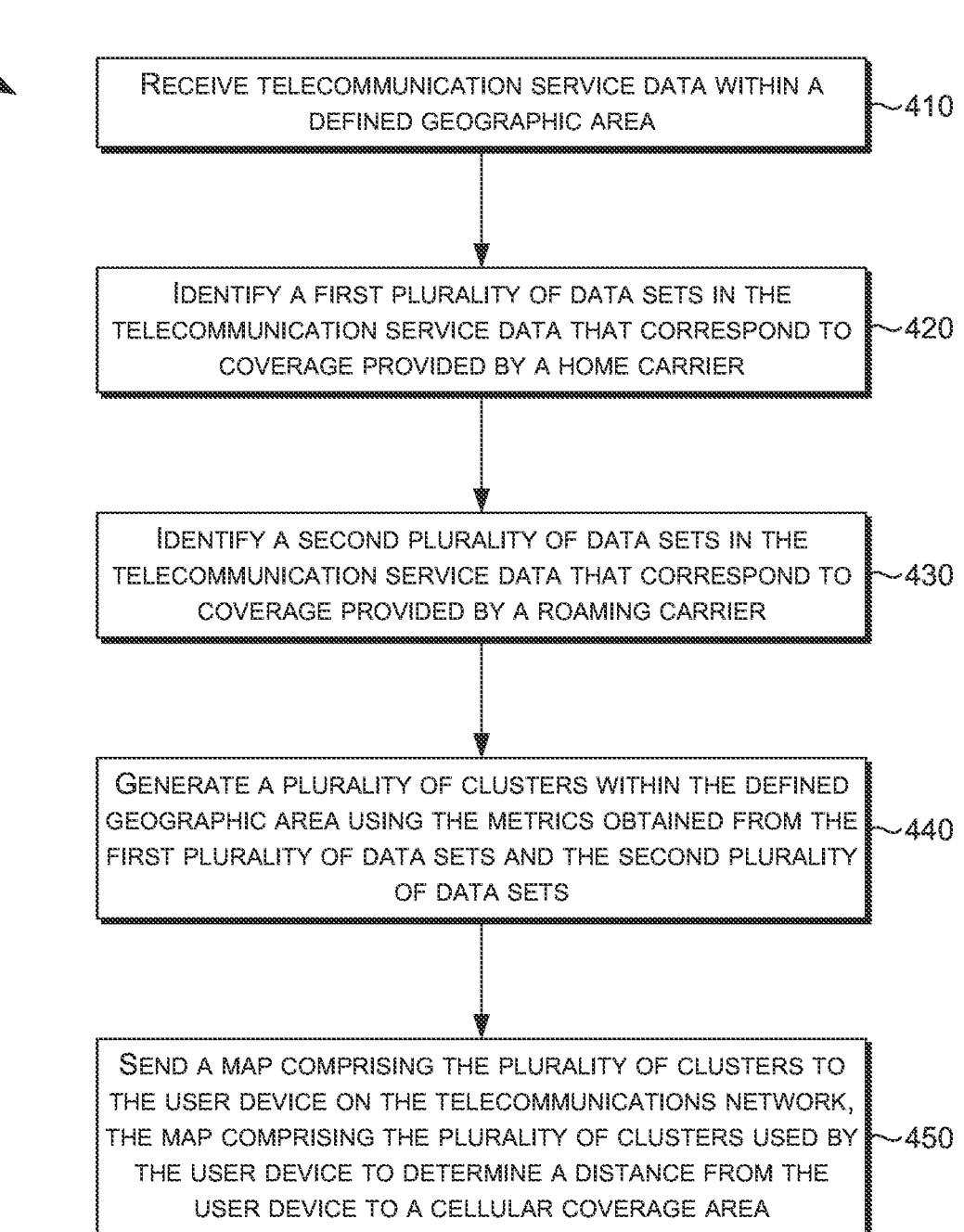

400

RECEIVE TELECOMMUNICATION SERVICE DATA WITHIN A DEFINED GEOGRAPHIC AREA ~410

IDENTIFY A FIRST PLURALITY OF DATA SETS IN THE TELECOMMUNICATION SERVICE DATA THAT CORRESPOND TO COVERAGE PROVIDED BY A HOME CARRIER ~420

IDENTIFY A SECOND PLURALITY OF DATA SETS IN THE TELECOMMUNICATION SERVICE DATA THAT CORRESPOND TO COVERAGE PROVIDED BY A ROAMING CARRIER ~430

GENERATE A PLURALITY OF CLUSTERS WITHIN THE DEFINED GEOGRAPHIC AREA USING THE METRICS OBTAINED FROM THE FIRST PLURALITY OF DATA SETS AND THE SECOND PLURALITY OF DATA SETS ~440

SEND A MAP COMPRISING THE PLURALITY OF CLUSTERS TO THE USER DEVICE ON THE TELECOMMUNICATIONS NETWORK, THE MAP COMPRISING THE PLURALITY OF CLUSTERS USED BY THE USER DEVICE TO DETERMINE A DISTANCE FROM THE USER DEVICE TO A CELLULAR COVERAGE AREA ~450

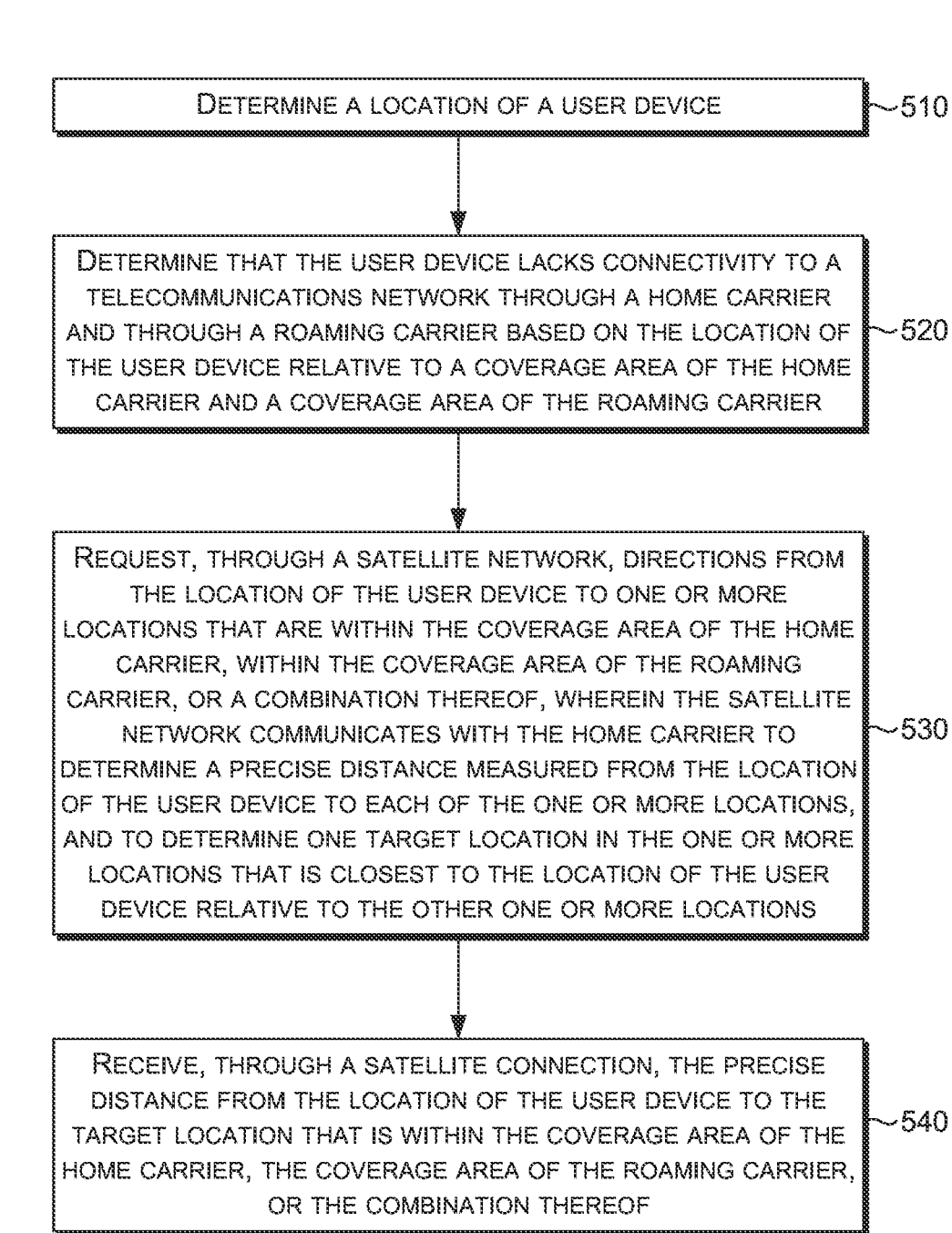

DETERMINE A LOCATION OF A USER DEVICE ~510

DETERMINE THAT THE USER DEVICE LACKS CONNECTIVITY TO A TELECOMMUNICATIONS NETWORK THROUGH A HOME CARRIER AND THROUGH A ROAMING CARRIER BASED ON THE LOCATION OF THE USER DEVICE RELATIVE TO A COVERAGE AREA OF THE HOME CARRIER AND A COVERAGE AREA OF THE ROAMING CARRIER ~520

REQUEST, THROUGH A SATELLITE NETWORK, DIRECTIONS FROM THE LOCATION OF THE USER DEVICE TO ONE OR MORE LOCATIONS THAT ARE WITHIN THE COVERAGE AREA OF THE HOME CARRIER, WITHIN THE COVERAGE AREA OF THE ROAMING CARRIER, OR A COMBINATION THEREOF, WHEREIN THE SATELLITE NETWORK COMMUNICATES WITH THE HOME CARRIER TO DETERMINE A PRECISE DISTANCE MEASURED FROM THE LOCATION OF THE USER DEVICE TO EACH OF THE ONE OR MORE LOCATIONS, AND TO DETERMINE ONE TARGET LOCATION IN THE ONE OR MORE LOCATIONS THAT IS CLOSEST TO THE LOCATION OF THE USER DEVICE RELATIVE TO THE OTHER ONE OR MORE LOCATIONS ~530

RECEIVE, THROUGH A SATELLITE CONNECTION, THE PRECISE DISTANCE FROM THE LOCATION OF THE USER DEVICE TO THE TARGET LOCATION THAT IS WITHIN THE COVERAGE AREA OF THE HOME CARRIER, THE COVERAGE AREA OF THE ROAMING CARRIER, OR THE COMBINATION THEREOF ~540

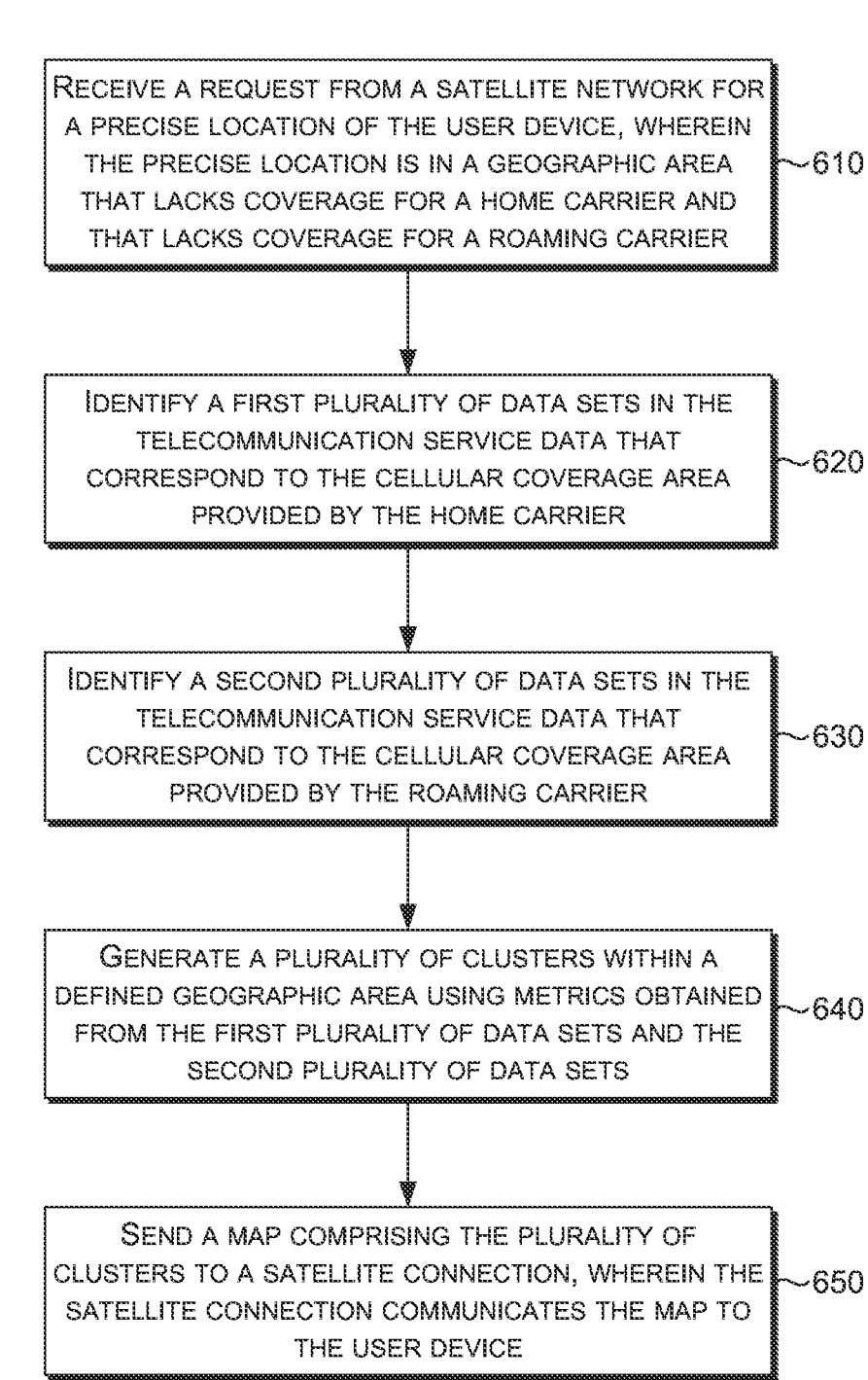

RECEIVE A REQUEST FROM A SATELLITE NETWORK FOR A PRECISE LOCATION OF THE USER DEVICE, WHEREIN THE PRECISE LOCATION IS IN A GEOGRAPHIC AREA THAT LACKS COVERAGE FOR A HOME CARRIER AND THAT LACKS COVERAGE FOR A ROAMING CARRIER —610

IDENTIFY A FIRST PLURALITY OF DATA SETS IN THE TELECOMMUNICATION SERVICE DATA THAT CORRESPOND TO THE CELLULAR COVERAGE AREA PROVIDED BY THE HOME CARRIER —620

IDENTIFY A SECOND PLURALITY OF DATA SETS IN THE TELECOMMUNICATION SERVICE DATA THAT CORRESPOND TO THE CELLULAR COVERAGE AREA PROVIDED BY THE ROAMING CARRIER —630

GENERATE A PLURALITY OF CLUSTERS WITHIN A DEFINED GEOGRAPHIC AREA USING METRICS OBTAINED FROM THE FIRST PLURALITY OF DATA SETS AND THE SECOND PLURALITY OF DATA SETS —640

SEND A MAP COMPRISING THE PLURALITY OF CLUSTERS TO A SATELLITE CONNECTION, WHEREIN THE SATELLITE CONNECTION COMMUNICATES THE MAP TO THE USER DEVICE —650

*FIG. 6*

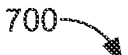
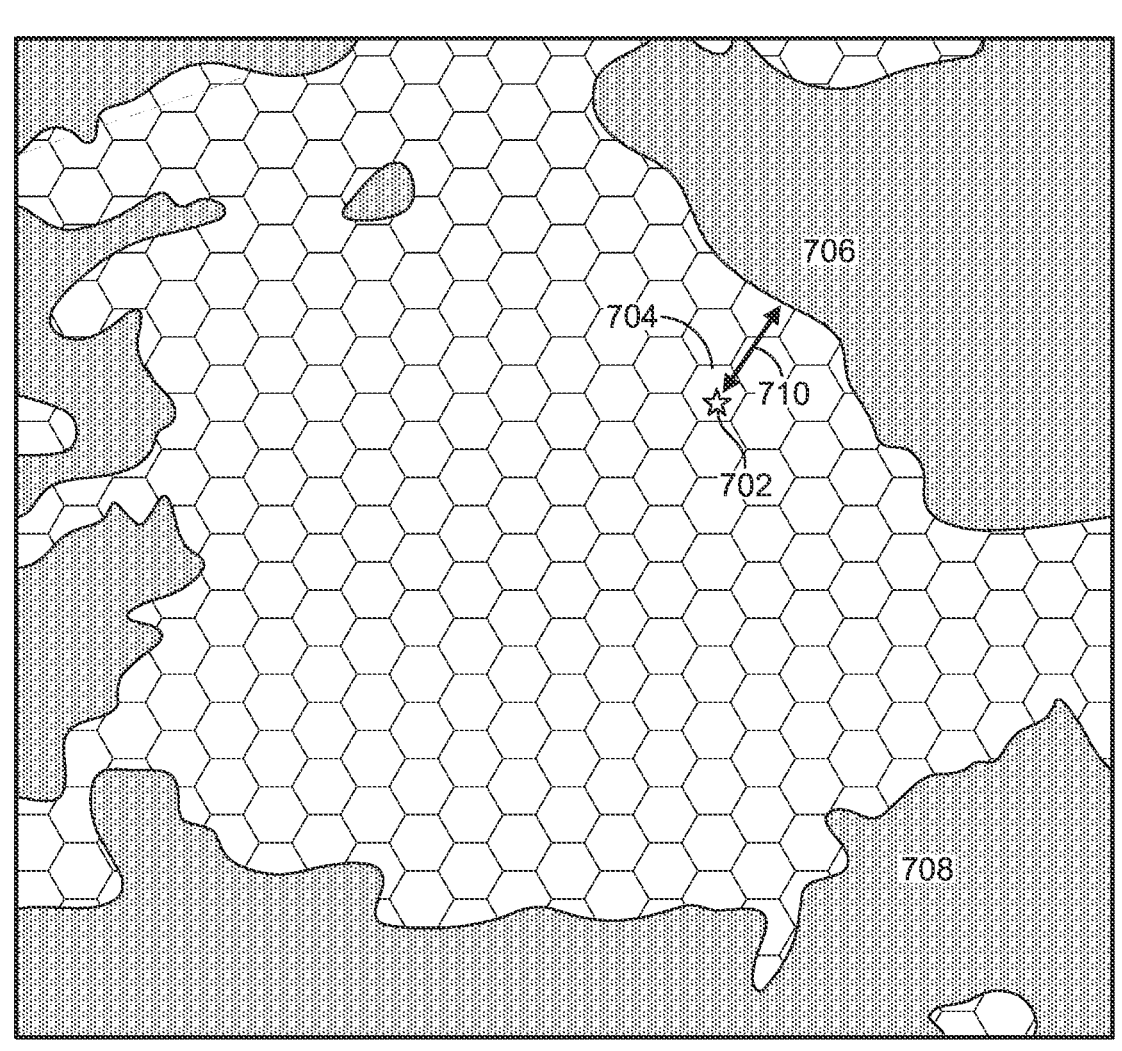
*FIG. 7*

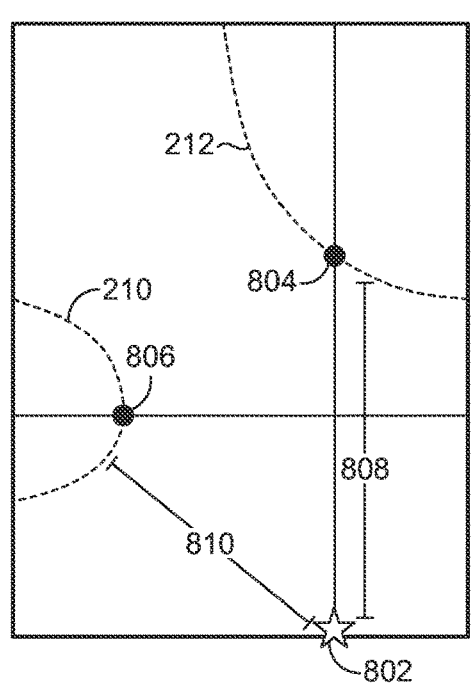
*FIG. 8A*
*FIG. 8B*
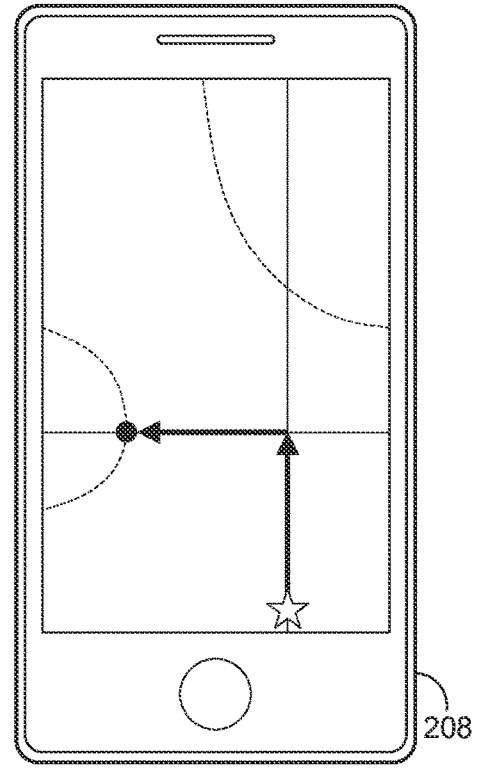
*FIG. 8C*
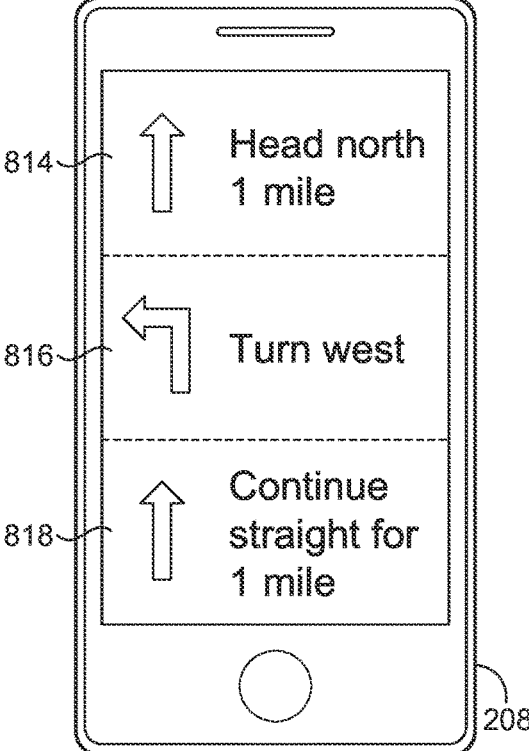
*FIG. 8D*

NO SERVICE EMERGENCY LOCATE FOR NETWORK COVERAGE

FIELD OF INVENTION

The present disclosure generally relates to wireless network coverage.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed to techniques for a user equipment (UE) to find the nearest coverage area, which intelligently identifies and locates various types of wireless networks with neighboring coverages areas using a map that is locally stored on the UE or satellite connection. In this manner, the technology assists a user (i.e., subscriber) by navigating the user, via a UE, to a geolocation that includes some type of wireless cellular coverage, for example, through a telecommunications carrier, a roaming carrier, and/or an emergency carrier. If the user is currently and physically located in an area with no coverage, the system will generate a map on the user's device showing a distance and a direction to the nearest coverage area, as shown and/or described in connection with at least one of the figures, and as set forth more completely in the claims.

According to various aspects of the technology, a UE actively searches for a network when it anticipates that it is located within an area of anticipated coverage by one or more terrestrial base stations. Cell search, selection, and reselection are some of the most intensely battery-consuming activities a UE can perform in a modern telecommunications network. Though most populated areas today have at least nearly ubiquitous cellular coverage, there are many times when a UE may depart said areas and consequently search for a terrestrial base station to select and attach.

By way of background, modern mobile network operators seek to provide a high level of persistent coverage for their subscribers. One of the difficulties with providing wireless telecommunications coverage occurs when subscribers are out of a service state. A service state of the UEs may include, for example, an in-service state when a UE is in-network (i.e., using services of a primary provider to which the UE is subscribed to, otherwise referred to as a home carrier), or when the UE is roaming (i.e., using services of a secondary provider providing coverage to the particular geographic location of the UE that has agreements in place with the primary provider of the UE, otherwise referred to as a roaming carrier). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out-of-service state when there are no service providers at the particular geographic location of the UE. When the UE is in an out-of-service state, it will not be able to make a phone call, even if it is an emergency. Since telecommunication coverage areas lines are invisible to the naked eye, the user of the UE may have no way of knowing which direction or how far away the nearest coverage area is to be able to send a message or make a call.

Unlike conventional solutions, aspects herein utilize precise location services (e.g., geo-location data, GPS coordinates, etc.), to display a map on the subscriber's UE to view their location in comparison to the nearest telecommunication coverage areas. The map can calculate the direction and distance to the nearest network. The map of hexbins may be pre-loaded onto the UE as a display, and based on the precise location services, the UE can first scan the area for service state coverage, followed by roaming partners, and finally non-roaming partners (e.g., emergency only carriers). Based on the latitude and longitude of the UE, the map would show where in the hexbins the UE is located and how far away the UE is from network coverage (e.g., "3 miles south to get coverage"). In various aspects, the map may not be pre-loaded onto the UE, but may instead use satellite connection to determine the distance to the nearest coverage area. For example, the UE can get the subscriber's precise location and prompt the subscriber to consent to use the satellite connection. The satellite connection can then hone back to the subscriber's home (e.g., in-service) network where the home network can use the subscriber's precise location coordinates and plot them into a map to find the nearest coverage to the subscriber. The home network can send this information back via satellite to the UE where a map will display showing how far away the UE is from coverage via a navigation system of a list of directions.

Accordingly, in a first aspect of the present disclosure a method is provided. In accordance, the method comprises determining that a UE is at a location that is outside a coverage area provided by a home carrier. The method also comprises determining an absence of any roaming carriers to provide coverage to the UE at the location. The method also comprises determining a precise location of the UE and using the precise location to determine a distance from the UE to a location where coverage is provided.

In a second aspect of the present disclosure, a system is provided with one or more processors and one or more computer storage hardware devices storing computer-usable instructions. When used by the one or more processors, the system causes the one or more processors to determine that a UE is at a location that is outside a coverage area provided by a home carrier. The system also comprises determining an absence of any roaming carriers to provide coverage to the UE at the location. The system also comprises determining a precise location of the UE and using the precise location to determine a distance from the UE to a location where coverage is provided.

In yet another aspect of the disclosure, a method is provided for providing cluster data to a UE for determining a distance from the UE to a cellular coverage area. The method comprises receiving telecommunication service data within a defined geographic area and identifying a first plurality of data sets in the telecommunication service data that correspond to coverage provided by a home carrier. The method also comprises identifying a second plurality of data sets in the telecommunication service data that correspond to coverage provided by a roaming carrier. The method also comprises generating a plurality of clusters within the defined geographic area using the metrics obtained from the first plurality of data sets and the second plurality of data sets. Finally, the method comprises sending a map comprising the plurality of clusters to the UE on the telecommunications network, the map comprising the plurality of clusters used by the user device to determine a distance from the UE to a cellular coverage area.

In another aspect of the present disclosure, a method is provided for determining a distance to a cellular coverage area. The method comprises determining a location of a UE and determining that the UE lacks connectivity to a telecommunications network through a home carrier and through a roaming carrier based on the location of the UE relative to a coverage area of the home carrier and a coverage area of the roaming carrier. The method also comprises requesting, through a satellite network, directions from the location of the UE to one or more locations that are within the coverage area of the home carrier, within the coverage area of the roaming carrier, or a combination thereof, wherein the satellite network communicates with the home carrier to determine a precise distance measured from the location of the UE to each of the one or more locations, and to determine one target location in the one or more locations that is closest to the location of the UE relative to the other one or more locations. The method also includes receiving, through a satellite connection, the precise distance from the location of the UE to the target location that is within the coverage area of the home carrier, the coverage area of the roaming carrier, or the combination thereof.

In another aspect of the present disclosure, a system is provided with one or more processors and one or more computer storage hardware devices storing computer-usable instructions. When used by the one or more processors, the system causes the one or more processors to determine a location of a UE and to determine that the user device lacks connectivity to a telecommunications network through a home carrier and through a roaming carrier based on the location of the UE relative to a coverage area of the home carrier and a coverage area of the roaming carrier. The system also comprises requesting, through a satellite network, directions from the location of the UE to one or more locations that are within the coverage area of the home carrier, within the coverage area of the roaming carrier, or a combination thereof, wherein the satellite network communicates with the home carrier to determine a precise distance measured from the location of the UE to each of the one or more locations, and to determine one target location in the one or more locations that is closest to the location of the UE relative to the other one or more locations. The system also comprises receiving, through a satellite connection, the precise distance from the location of the UE to the target location that is within the coverage area of the home carrier, the coverage area of the roaming carrier, or the combination thereof.

In yet another aspect, a method is provided for providing cluster data to a UE for determining a distance from the UE to a cellular coverage area. The method comprises receiving a request from a from a satellite network for a precise location of the UE, wherein the precise location is in a geographic area that lacks coverage for a home carrier and that lacks the coverage for a roaming carrier. The method also comprises identifying a first plurality of data sets in telecommunication service data that correspond to the cellular coverage area provided by the home carrier and then identifying a second plurality of data sets in the telecommunication service data that correspond to the cellular coverage area provided by the roaming carrier. The method also comprises generating a plurality of clusters within a defined geographic area using metrics obtained from the first plurality of data sets and the second plurality of data sets and sending a map comprising the plurality of clusters to a satellite connection, wherein the satellite connection communicates the map to the UE, the map comprising the plurality of clusters and directions usable by the UE to determine a distance from the user device to the cellular coverage area of the home carrier or the roaming carrier.

BRIEF DESCRIPTION OF THE DRAWINGS

Aspects of the present disclosure are described in detail herein with reference to the attached figures, which are intended to be exemplary and non-limiting, wherein:

FIG. 3 depicts a flow diagram of an exemplary method for determining a distance from the UE to a location where coverage is provided, in accordance with aspects described herein;

FIG. 4 depicts a flow diagram of an exemplary method for using a map to determine a distance from the UE to a location where coverage is provided, in accordance with aspects described herein;

FIG. 5 depicts a flow diagram of an exemplary method for receiving, through a satellite connection, a precise distance from the UE to where coverage is provided, in accordance with aspects described herein;

FIG. 6 depicts a flow diagram of an exemplary method for sending, through a satellite connection, a precise distance from the UE to where coverage is provided, in accordance with aspects described herein;

FIG. 7 illustrates a map screen shot in which implementations of the present disclosure may be employed, in accordance with aspects herein; and FIGS. 8A-8D determining the distance to the nearest coverage area and then providing a map in the form of a navigation system or a list to the UE, in accordance with aspects herein.

DETAILED DESCRIPTION

Figure 1:
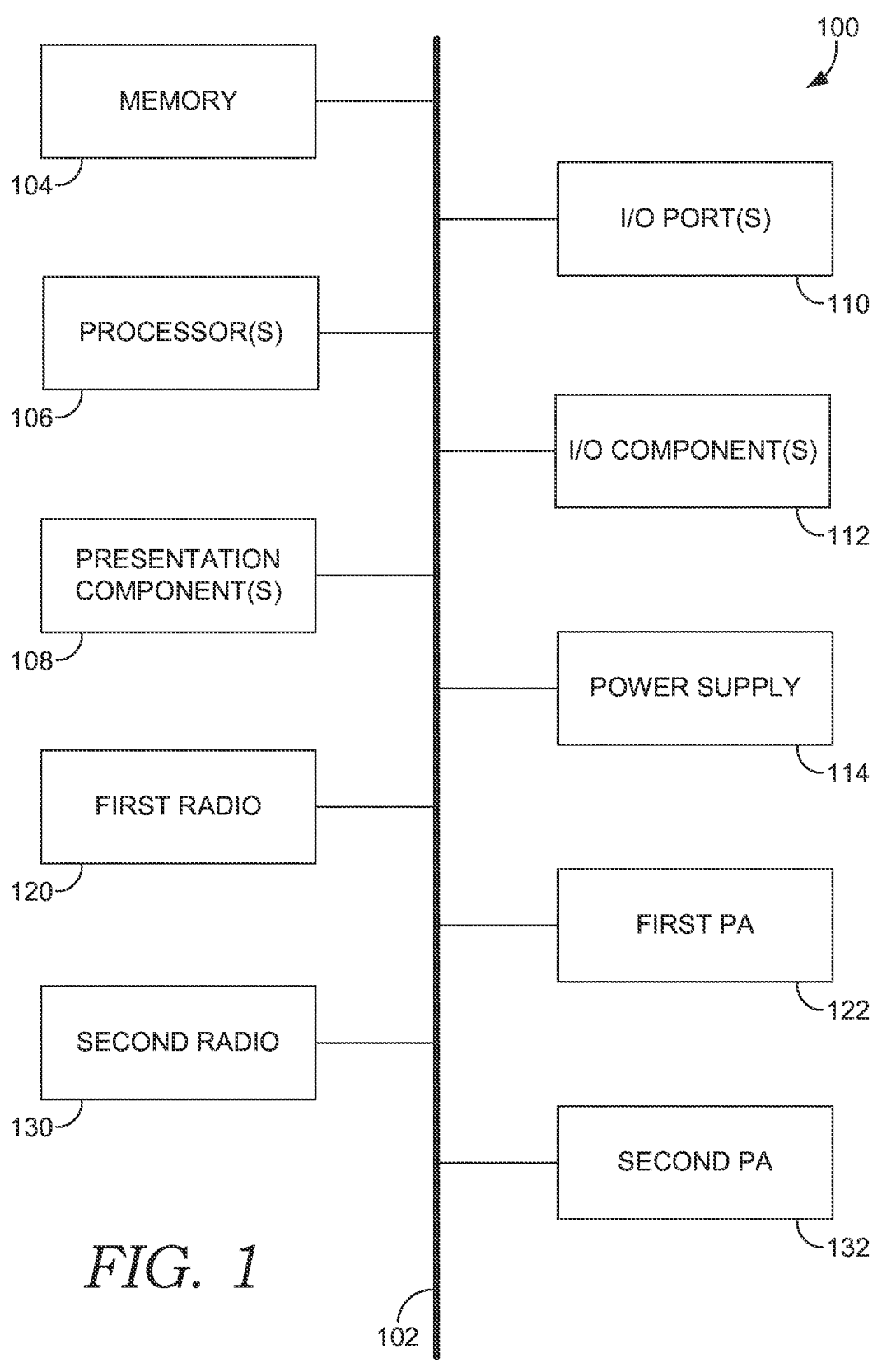
FIG. 1 depicts an exemplary computing environment suitable for use in implementations of the present disclosure.

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology 5G/5G NR Fifth-Generation Wireless Access Technology/New Radio 5GC Fifth-Generation Wireless Access Technology Core Network AAU Active Antenna Unit BRS Broadband Radio Service CD-ROM Compact Disk Read Only Memory CDMA Code Division Multiple Access CU Central Unit DU Distribution Unit EIRP Equivalent Isotropically Radiated Power eNodeB Evolved Node B EVDO Evolution-Data Optimized GIS Geographic/Geographical/Geospatial Information System gNodeB/gNB Next Generation Node B gNB CU Next Generation Node B Central Unit gNB DU Next Generation Node B Distribution Unit GPRS General Packet Radio Service GSM Global System for Mobile Communication iDEN Integrated Digital Enhanced Network DVD Digital Versatile Disc EEPROM Electrically Erasable Programmable Read-Only Memory FD-MIMO Full Dimension Multiple-Input Multiple-Output IOT Internet of Things IIOT Industry Internet of Things LED Light Emitting Diode LTE Long Term Evolution MEC Mobile Far Edge Computer MD Mobile Device MIMO Multiple-Input Multiple-Output mMIMO Massive Multiple-Input Multiple-Output MMU Massive Multiple-Input Multiple-Output Unit mmWave Millimeter Wave NEXRAD Next-Generation Radar NR New Radio OOBE Out-of-Band-Emission OTN Optical Transport Network PC Personal Computer PCS Personal Communications Service PDA Personal Digital Assistant PLMN Public Land Mobile Network PRB Physical Resource Block vPRB Virtualized Physical Resource Block RAN Radio Access Network RAM Random Access Memory RET Remote Electrical Tilt RF Radio-Frequency RFI Radio-Frequency Interference RIC Radio Intelligent Controller RLF Radio Link Failure R/N Relay Node RNR Reverse Noise Rise ROM Read-Only Memory RRU Remote Radio Unit RSRP Reference Signal Receive Power RSRQ Reference Signal Receive Quality RSSI Received Signal Strength Indicator RU Radio Unit SINR Signal-to-Interference-&-Noise Ratio SNR Signal-to-Noise Ratio SON Self-Organizing Networks TDMA Time Division Multiple Access TXRU Transceiver (or Transceiver Unit)

UE User Equipment

UMTS Universal Mobile Telecommunications System

UTRAN UMTS Radio Access Network

E-UTRAN Evolved Universal Mobile Telecommunications System

WCD Wireless Communication Device (interchangeable with UE)

WLAN Wireless Local Area Network

XR Extended Reality

Aspects herein may be embodied as, among other things: a method, system, or set of instructions embodied on one or more computer-readable media. Aspects may take the form of a hardware aspect or an aspect combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 100 shown in FIG. 1. These technologies can store data momentarily, temporarily, or permanently.

The term "hexbin" refers to a computerized algorithm and technique for partitioning a geospatial object, e.g., a map of a defined geographic region, into a plurality of adjacent hexagon shapes with defined boundaries. As such, adjacent hexbins share a common planar boundary defined by their shape. Hexbins may be used to represent information of the map of a defined geographic region as a type of grip-map. Although aspects herein discuss and refer to the use of hexbins, it will understood that other partitioning techniques, other shapes, and the like are contemplated to be within the scope of the invention. As such, hexbins are used throughout and incorporated into the figures as a mere example that is helpful in illustrating and discussing aspects.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1XA, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

The terms "home carrier," "roaming carrier," and "emergency-only carrier" refer to three different service providers and the type of connectivity a user experiences based on their location and subscription. The home carrier is the user's primary mobile service provider with whom the user has a subscription or a contract. When a user travels outside the coverage area of their home carrier, the user's UE might still pick up signal and service from another carrier's network, known as the roaming carrier. The roaming carrier is a local network which the user's UE connects to when the UE is outside of its home carrier's service area. An emergency-only carrier refers to a local carrier that is outside of the coverage area for both the UE's home carrier and any roaming carrier's and that can be accessed strictly for emergency services. Regardless of the user's carrier or plan, in many regions, mobile phones are required to allow emergency calls (i.e., 911 in the United States) even if they are not currently active or in service. When the UE is connected to an emergency-only carrier, the user will not be able to make regular calls, send texts, or use data—only emergency calls can be made.

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Coverage area," "cells," and "cell site" can be used interchangeably and are generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms "radio," "controller," "antenna," and "antenna array" are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The terms "servicing" and "providing signal coverage," "providing network coverage," and "providing coverage," are interchangeably used to mean any (e.g., telecommunications) wireless service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/ measurement, a SS signal-to-noise and interference ratio (SS-SINR) value/measurement, and/or the like. Alternatively or additionally, in some aspects, signal strength may also be measured and provided in terms of channel state information (CSI) values.

Generally, a "satellite" is characterized by its orbit around the earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO)—also referred to herein as characterizing an orbital plane. Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous (i.e., geosynchronous earth orbit [GEO]) on the basis that its orbital period is approximately equal to the length of a sidereal or solar day (approximately 24 hours); generally, a satellite in geosynchronous orbit will appear to be in the same position relative to a fixed point on the surface of the Earth at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth. As used herein, a satellite in LEO has a lower orbital plane than a satellite in MEO or HEO, an MEO satellite has a higher orbital plane than a satellite in LEO, and an HEO satellite has a higher orbital plane than a satellite in LEO or MEO.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

Referring to FIG. 1, an example of a computing device 100 is shown that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some aspects, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various aspects, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
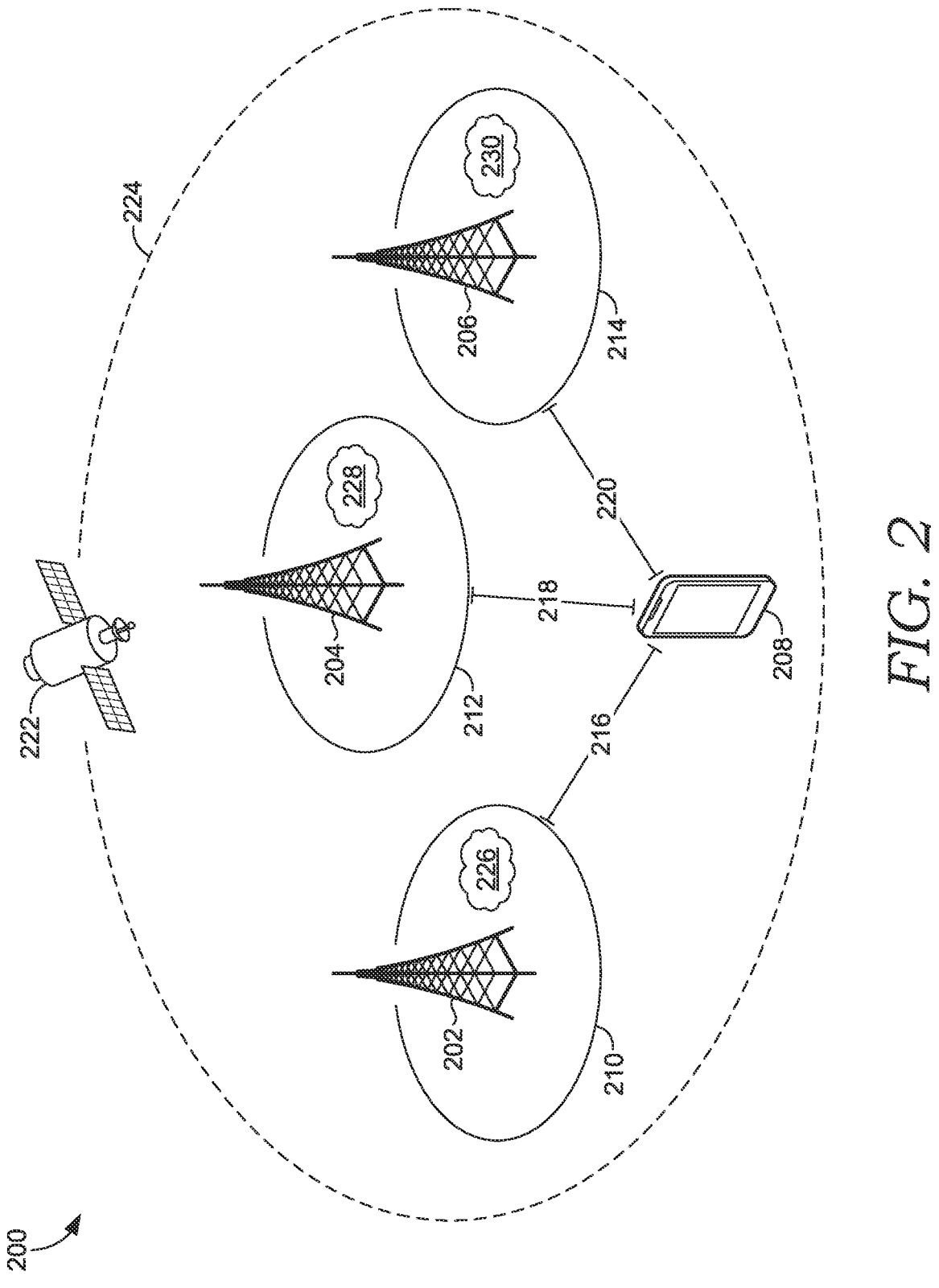
FIG. 2 depicts a diagram of an exemplary environment in which implementations of the present disclosure may be employed.

Turning now to FIG. 2, an example network environment 200 is illustrated in which implementations of the present disclosure may be employed. At a high level the network environment 200 comprises one or more UEs, including a UE 208. The network environment 200 includes one more persistent coverage zones, including terrestrial base stations. In FIG. 1, a first base station 202 creates a first persistent coverage zone 210, a second base station 204 creates a second persistent coverage zone 212, and a third base station 206 creates a third persistent coverage zone 214. Though referred to as "persistent," each of the first persistent coverage zone 210, the second persistent coverage zone 212, and the third persistent coverage zone 214 may not provide uniform or uninterrupted coverage to a UE. Instead, each of the first persistent coverage zone 210, the second persistent coverage zone 212, and the third persistent coverage zone 214 may be defined as an area where UEs are expected to have an increased likelihood of persistent coverage with one or more radio access networks (e.g., based on meeting or exceeding a threshold likelihood of successfully camping on a base station). Though the UE 208 is illustrated as a cellular phone, a UE suitable for implementations with the present disclosure may be any computing device having any one or more aspects described with respect to FIG. 1. Similarly, though each of the base stations, including the first base station 202, are illustrated as macro cells, any scale or form or access point acting as a transceiver station for wirelessly communicating with a UE, including small cells, pico cells, and the like, are suitable for use with the present disclosure.

Each of the base stations of network environment 200 are configured to wirelessly communicate with UEs, such as the UE 208. In aspects, each of the terrestrial base stations may communicate with a UE using any wireless telecommunication protocol desired by a network operator, including but not limited to 3G, 4G, 5G, 6G, 802.11x and the like. The first base station 202 is associated with a network identifier, which may be the same as the network identifier(s) of the first persistent coverage zone 210, the second persistent coverage zone 212, and/or the third persistent coverage zone 214. The base station may have a connection to one or more core network components within a network, shown here as the home carrier network 226. Accordingly, the first base station 202 is also referred to as a home carrier base station. The second base station 204 may have a connection to one or more core network components of another network, shown here as roaming carrier network 228. Accordingly, the second base station 204 is also referred to as a roaming carrier base station The third base station 206 may have a connection to one or more core network components of yet another network, shown here as an emergency-only carrier network 230. Accordingly, the third base station 206 is also referred to as an n emergency-only carrier base station. Each of the base stations of network environment 200, including the first base station 202, provides wireless telecommunication coverage to the first persistent coverage zone 210; as illustrated in FIG. 2, the first base station 202 serves a first persistent coverage zone 210. As shown in FIG. 1, the boundary of the first persistent coverage zone 210 is presently distanced from the UE 208 by a first distance 216, such that the UE 208 is outside of the range of the first persistent coverage zone 210. The second base station 204 provides wireless telecommunication coverage to the second persistent coverage zone 212; as illustrated in FIG. 2, the second base station 204 serves UEs located within a second persistent coverage zone 212. The UE 208 is outside of the boundary of the second persistent coverage zone 212 in FIG. 1, by a second distance 218 measured from that boundary to the UE 208. The third base station 206 provides wireless telecommunication coverage to the third persistent coverage zone 214; as illustrated in FIG. 2, the third base station 206 serves UEs located within a third persistent coverage zone 214. In FIG. 1, the UE 208 is presently located outside the boundary of the third persistent coverage zone 214, as shown by a third distance 220 measured from the boundary of the third geographic coverage are 214 to the UE 208. In aspects, each of the first base station 202, the second base station 204, and the third base station 206, can be owned by different telecommunication carriers. For example, the first base station 202 and corresponding first persistent coverage zone 210 may be owned by a home carrier to which the UE 208 is service subscriber and/or customer. In aspects, the second base station 204 with the second persistent coverage zone 212 may be owned by a roaming carrier that is different from the home carrier. In aspects, the third base station 206 with the third persistent coverage zone 214 may be owned by an emergency-only carrier that is different from the roaming carrier and the home carrier.

A UE must perform an active search to determine which base stations, if any, it is capable of connecting to. This process is referred to herein as a "cell search," and generally comprises acquiring time and frequency synchronization with a cell associated with a base station and detecting an identity of that cell by tuning to one or more specific frequencies, detecting/decoding synchronization signals, detecting/decoding a physical broadcast channel (PBCH), and detecting/decoding the physical downlink shared channel (PDSCH). When performing the cell search, a particular UE typically actively scans frequency bands in which it is capable of communicating for synchronization signals from a base station. Upon detection of synchronization signals from one or more base stations, the UE will perform a cell selection procedure (typically based on best quality of service metrics), perform an attachment procedure with the base station, and then being carrying out a wireless communication session. In aspects, if the UE 208 is out of its home coverage area (i.e., first persistent coverage zone 210), or its roaming coverage area (i.e., second persistent coverage zone 212), it will not have cellular service (i.e., the UE 208 will be in the out-of-service state discussed above). In order to send a message or place a call, the UE 208 must be in a coverage area (i.e., service state). Therefore, the present disclosure is directed to determining each of a first, second, and third distances 216, 218, and/or 220 as measured from the UE 208 to each of the first, second, and third persistent coverage zones 210, 212, and 214, as provided by the corresponding first, second, and third base stations 202, 204, and 206.

To more efficiently conduct cell searching, in one aspect, the home carrier network 226 may determine that the UE 208 is at a location that is outside the first persistent coverage zone 210 provided by the first base station 202. The home carrier network 226 may then determine that the UE 208 is at a location that is also outside the second persistent coverage zone 212 provided by second base station 204 associated with the roaming carrier network 228. In aspects, to determine whether there is absence of any roaming carrier networks, such as roaming carrier network 228 accessible within the second persistent coverage area 212 that is provided by the second base station 204, a local file can be scanned on the UE 208. Using precise location services (i.e., GPS), the precise location of the UE 208 is determined using latitude and longitude coordinates, and based on the precise location, a first distance 216 and/or a second distance 218 is/are determined as measured from the UE 208 to a location where service is provided within the first persistent coverage zone 210 and/or second persistent coverage zone 212. In other example aspects, the home carrier network 226 may determine that the UE 208 is attempting to make an emergency call, so the home carrier network 226 can conduct a cell search to determine whether the UE 208 is located within the third persistent coverage zone 214 and thus could access services of the emergency-only carrier network 230 via the third base station 206. When the UE 208 is determined to not be in the third persistent coverage zone 214 of the third base station 206, the home carrier network 226 can use the precise location of the UE 208 to determine the third distance 220 measured from the UE 208 to the third persistent coverage zone 214, i.e., how far away the UE 208 is located from the coverage area.

With continued reference to FIG. 2, the network environment 200 is illustrated for utilizing a satellite 222 with satellite coverage area 224 to improve cell searching with one or more terrestrial base stations. The home carrier network 226, for example, is communicatively coupled to the satellite 222, having satellite coverage area 224. Although FIG. 2 is discussed with regard to the home carrier network 226, communications between other networks and the satellite 222, such as the roaming carrier network 228 and the emergency-only carrier network 230 are contemplated and within the scope of this Description. Accordingly, the home carrier network 226 is but one example, and the home carrier network 226 may comprise or operate within any quantity and/or different types of networks in various aspects. In FIG. 2, the first base station 202 may be connected to (and operate within) the home carrier network 226 via one or more wireless or wired connections, and may be connected to the satellite 222 via a feeder link (not illustrated for simplicity). The first base station 202 may take the form of a device or a system of components configured to communicate with the UE 208 via the satellite 222 and to provide an interface between the home carrier network 226 and the satellite 222. Generally, though not illustrated, the first base station 202 utilizes one or more antennas to transmit signals to the satellite 222 via a forward uplink and to receive signals from the satellite 222 via a return downlink. The first base station 202 may communicate with a plurality of satellites, including the satellite 222. The home carrier network 226 comprises any one or more public or private networks, any one or more of which may be configured as a satellite network, a publicly switched telephony network (PSTN), or a cellular telecommunications network. In various aspects, the home carrier network 226 may comprise and/or operate as part of at least a portion of a satellite network connecting a plurality of base stations (e.g., including the first, second, and/or third base stations 202, 204, and 206) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 222, which improves cell searching with one or more terrestrial base stations by extending coverage, providing faster searches, using beamforming to direct signals to more precise areas, and the like. For example, in remote areas where terrestrial base stations are sparse, the satellite can provide assistance data to the UE, such as GPS, to allow the UE to determine its approximate location to therefore anticipate which terrestrial base stations to search for, thereby speeding up the cell search process. In another example, advanced satellite systems can use beamforming to direct signals more precisely to specific area, which can enhance the UE's ability to search and connect to a cell, especially in challenging terrains or environments. The satellite 222 is generally configured to relay communications between the first base station 202 and the UE 208. The satellite 222 communicates with the first base station 202 using the feeder link, and communicates with the UE 208 using a user link (not illustrated). The user link comprises a forward downlink used to communicate signals from the satellite 222 to the UE 208 and a return uplink used to communicate signals from the UE 208 to the satellite 222. The satellite 222 may communicate with the UE 208 using any wireless telecommunication protocol desired by a network operator (e.g., home carrier, roaming carrier, etc.), including but not limited to 3G, 4G, 5G, 6G, 802.11x and the like. The satellite 222 may be configured to utilize a plurality of individual beams to communicate with multiple different areas concurrently and/or simultaneously. Similarly, the UE 208 may utilize multiple downlinks and/or multiple uplinks to communicate with the satellite 222, using any one or more frequencies as desired by the satellite 222 and/or other network operator.

In aspects, the UE 208 may display orientation information on a graphic user interface of the UE 208 in order to connect the UE 208 to the satellite 222 for cell searching, as further discussed hereinafter. In aspects, the UE 208 may comprise an antenna, whether internal or external, that permits a user to orient the UE 208 in ways that would improve the connection quality between the UE 208 and a satellite 222. In other aspects, dataset that is locally stored on the UE 208 may comprise an indication about whether a particular satellite is vertically polarized, horizontally polarized, or circularly polarized, e.g., orientation information. Accordingly, the one or more notifications or indications may comprise an instruction that the UE 208 (e.g., an external antenna integrate within and/or coupled thereto) should be oriented in particular fashion in order to communicate with that particular satellite. The orientation information may suggest that the UE 208 be positioned, for example by a user, vertically, horizontally, or at a 45 degree angle based on the polarization of the particular satellite and the polarization of the UE 208. The orientation information may suggest an elevation and azimuth for pointing an external antenna, and/or may suggest an elevation and azimuth for providing the UE 208 an unobstructed view of the sky, additionally or alternatively.

Having described the network environment 200 and components thereof, it will be understood by those of ordinary skill in the art that the network environment 200 is but one example of a suitable system and is not intended to limit the scope of use or functionality of the present invention. Similarly, the network environment 200 should not be interpreted as imputing any dependency and/or any requirements with regard to each component and combination(s) of components illustrated in FIG. 2. It will be appreciated by those of ordinary skill in the art that the location of components illustrated in FIG. 2 is an example, as other methods, hardware, software, components, and devices for establishing a communication links between the components shown in FIG. 2, may be utilized in implementations of the present invention. It will be understood to those of ordinary skill in the art that the components may be connected in various manners, hardwired or wireless, and may use intermediary components that have been omitted or not included in FIG. 2 for simplicity's sake. As such, the absence of components from FIG. 2 should be not be interpreted as limiting the present invention to exclude additional components and combination(s) of components. Moreover, though components are represented in FIG. 2 as singular components, it will be appreciated that some aspects may include a plurality of devices and/or components such that FIG. 2 should not be considered as limiting the number of a device or component.

Turning now to FIGS. 3-6, examples of methods are discussed that can be performed using one or more of the components and component interactions previously described with regard to FIGS. 1 and 2. As such, the methods are discussed only briefly, as it will be understood from this Description that the previous discussions and details described with regard to FIGS. 1 and 2 can and/or may be applicable to various aspects of the example methods illustrated in the flowcharts of FIGS. 3-6. Additionally or alternatively, it will be understood that the example methods discussed herein can be implemented or performed via the execution of computer-readable instructions stored on computer readable media, by one or more processors.

Continuing to FIG. 3, a flowchart is shown for method 300 of determining a distance measured from the UE to a location where coverage is provided, for example, when the UE is not within range to the coverage area of any terrestrial carrier network but is within the coverage area of a satellite. The method 300 may be utilized for cell searching, for example. At block 310, a UE is at a location that is outside a coverage area provided by a home carrier. At block 320, the UE determines that there is an absence of any roaming carriers to provide coverage to the UE at the location. At block 330, the UE uses precise location services (i.e., GPS) to determine its precise location. At block 340, using the UE's precise location and the map that is locally stored on the UE, the UE determines a distance from the UE to a location where coverage is provided, specifically using the precise location that is determined.

FIG. 4 depicts a flowchart of a method 400 for sending a map to a UE to be locally stored on the UE, wherein the map comprises information that will allow the UE to determine a distance from the UE to a cellular coverage area in situations when the UE is not in a terrestrial network coverage area (i.e., the UE device is operating in an "out-of-service" state as there are no accessible, in-range terrestrial wireless networks). At block 410, a UE may receive telecommunication service data, wherein the telecommunication service data includes information pertaining to home carrier coverage areas, roaming carrier coverage areas, and emergency-only carrier coverage areas within a defined geographic area. At block 420, a first plurality of data sets can be identified from the telecommunication service data that correspond to coverage provided by a home carrier. At block 430, a second plurality of data sets can be identified from the telecommunication service data that correspond to coverage provided by a roaming carrier. At block 440, a plurality of clusters can be generated by the network within the defined geographic area using the data sets obtained from blocks 420 and 430. At block 450, is the home network can generate a map and send it to the UE, to be locally stored on the UE, wherein the map comprises the plurality of clusters obtained from blocks 420 and 430 and wherein the map is used by the UE to determine a direction and the distance from the precise location of the UE to a cellular coverage area. It should be understood that this map will be updated and re-sent to the UE as coverage areas change or as new coverage areas become available. In aspects, the map is generated by a network component associated with the home carrier and is stored locally on the UE. In example aspects, a third plurality of data sets can be identified in the telecommunication service data that correspond to coverage provided by a non-roaming carrier (i.e., emergency-only carrier). This third plurality of data sets can be included in the plurality of clusters generated by the home network at block 440, wherein the map generated at block 450 can also include the third plurality of clusters that is directed to an emergency-only carrier, thereby allowing the UE to see where the nearest emergency-only coverage is in comparison to its location.

Continuing to FIG. 5, a flowchart of an example method 500 is shown. The method 500 utilizes a satellite connection to send a precise distance from a UE to a telecommunications carrier. At block 510, the UE determines its location using precise location services (i.e., GPS). At block 520, the UE determines that it lacks connectivity to a telecommunications network through a home carrier and/or a roaming carrier based on the location of the UE relative to a coverage area of either the home carrier and/or the roaming carrier. At block 530, the UE can request, through a satellite network, directions from the location of the UE to one or more locations that are within the coverage area of the home carrier and/or the roaming carrier, wherein the satellite network can communicate with the home carrier to determine a precise distance measured from the location of the UE to each of the one or more locations of the home carrier and/or the roaming carrier to determine the "target location" based on proximity to the UE. At block 540, the UE can receive, through the satellite connection, the precise distance from the location of the UE to the target location that is within the coverage area of the home carrier and/or the roaming carrier.

FIG. 6 depict a flowchart of another example method 600 for sending a map to the UE, wherein a network does so by leverage a satellite to communicate indirectly with the UE. At block 610, the home network can receive a request from a satellite network for a precise location of the UE, wherein the precise location is in a geographic area that lacks coverage for both a home carrier and a roaming carrier. At block 620, the home network can identify a first plurality of data sets in the telecommunication service data that correspond to the cellular coverage area provided by the home carrier. At block 630, the home network can identify a second plurality of data sets in the telecommunication service data that correspond to the cellular coverage area provided by the roaming carrier. At block 640, the home network can generate a plurality of clusters within a defined geographic area using the data sets obtained from blocks 620 and 630. At block 650, the network can send a map comprising the plurality of clusters to the satellite connection, wherein the satellite connection communications the map to the UE. In example aspects, a third plurality of data sets can be identified in the telecommunication service data that correspond to coverage provided by a non-roaming carrier (i.e., emergency-only carrier). This third plurality of data sets can be included in the plurality of clusters generated by the home network at block 640, wherein the map generated at block 650 can also include the third plurality of clusters that is directed to an emergency-only carrier, thereby allowing the UE to see where the nearest emergency-only coverage is in comparison to its location.

Continuing to FIG. 7, an example GUI 700 of an application running on a UE is illustrated in which implementations of the present disclosure may be employed, in accordance with aspects herein. The application is used to display a map at the UE along with directions to navigate the UE to the nearest coverage area (e.g., independent of whether the coverage area is associated with a home carrier, roaming carrier, or emergency-only carrier). Precise location information for a UE utilizes precise location services, such as GPS, which has geolocating capabilities. GPS receivers may be highly sensitive and exceptionally accurate when establishing a location, for example, to an accuracy of within one centimeter. GPS receivers can thus provide a precise location using latitude, longitude, and altitude information.

Generally, geo-located data for a defined geographic region is ingested and processed in the application so that the application can autonomously identify and prioritize precise site locations that are associated with impaired or degraded service quality and/or service coverage. Initially, the geo-located data for a particular geographic region is ingested and partitioned by the application based on geo-location data (e.g., GPS coordinates). The application generates a plurality of a hexbins that represent distinct coverage/service areas within the particular geographic region based on the geo-located data. For example, the hexbins could represent all of the coverage areas (i.e., roaming, non-roaming, and emergency-only) in the United States. In other aspects, the map could represent all of the coverage areas outside of the United States. As such, each hexbin can be used to visually (e.g., via a GUI) to represent the geo-located data that corresponds to a particular scale or size (e.g., a defined quantity of meters of the geographic region of the corresponding hexbin). It will be understood from this Detailed Description that hexbins and the scales of such hexbins discussed herein are merely illustrative and non-limiting examples used for clarity of the discussion, as other shapes and scales for representing and analyzing the geo-located data for a particular geographic region are presently contemplated to be within the scope of the invention.

Continuing, the hexbins may be arranged relative to one another, and further, may be arranged as overlaying a base layer of a geographic map that accurately represents the corresponding geo-located data for each hexbin within the particular geographic region. In other words, in aspects, telecommunication service data can be partitioned into a plurality of hexbins that can represent a plurality of areas within a defined geographic area, each hexbin in the plurality of hexbins being associated with a corresponding data set for a corresponding area within the plurality of areas. The hexbins may be displayed via the GUI700 generated through the application as overlaying the base layer of the geographic map of the corresponding particular geographic region. In aspects, the scale or "size" of the hexbins can be modified to increase or decrease the data granularity of the distinct coverage/service areas within the particular geographic region. In the GUI 700, each hexbin may be displayed using a color-coded and/or pattern-based schema that visually distinguishes between and represents a level or quantification of wireless UE service quality and/or coverage, as autonomously determined by the application using the geo-located data for that coverage/service area corresponding to the particular hexbin.

In some aspects, GUI 700 can show a map that is locally stored on a UE. In example aspects, the star represents the location of the UE 208 at location 702, in hexbin 704. In this example, hexbin 704 is outside of a coverage area provided by a home carrier 708 or a roaming carrier 706. Utilizing systems and methods discussed above in FIGS. 1-6, a locally stored map can be generated on the UE showing the directions and distance 710 from the current location of the UE to the nearest coverage area, which in this example is provided by roaming carrier 706. The user of the UE can then travel the distance 710 to the nearest coverage area (i.e., the roaming carrier 706). For example, the map might communicate that the roaming carrier 706 is 1.5 miles northeast. In this example, the center of hexbin 704 can be used to calculate the approximate distance 710 and direction to the nearest network coverage area provided roaming carrier 706.

FIGS. 8A-8D depict screenshots of the application-generated map, in accordance with aspects herein. The screenshots are illustrated in a simplified manner, such that the component, device, module, physical or virtual location, relative arrangement, and the like can vary from what is depicted. As such, various components and/or modules may operate on the same computing device, and the screenshots have been simplified such that the configurations and arrangement is just one suitable organization, and the quantity of each of the components and/or modules can vary from what is depicted (e.g., components and/or modules may be omitted and/or could be greater in quantity than shown).

In aspects, FIG. 8A depicts a screenshot produced by the application, using one or more of the previously discussed methods, wherein the star represents the current precise location 802 of the UE 208, as determined via GPS, and which is outside of all terrestrial coverage areas. In the examples of FIGS. 8A-8D, the first persistent coverage zone 210 and the second persistent coverage zone 212 are the same as those depicted in FIG. 2. As is illustrated, the current precise location 802 of the UE 208 is outside of both the first persistent coverage zone 210 and the second persistent coverage zone 212. In aspects, a first distance 808 and a second distance 810 are measured to determine which of the first persistent coverage zone 210 and the second persistent coverage zone 212 is closer to the location 802 of the UE 208, i.e., which of the first distance 808 or the second distance 810 is the lesser distance. In aspects, the first distance 808 and the second distance 810 are measured from a first point of entry of the corresponding first persistent coverage zone 210 or the second persistent coverage zone 212 relative to the current precise location 802 of the UE 208, independent of real-world pathways such as roads or highways, which may not be present though depicted in this example.

Turning to FIG. 8B, it has been determined that the first persistent coverage zone 210 had the nearest point of entry 806 compared to the second persistent coverage zone 212, as the first distance 808 is less than the second distance 810. Based on the determination, navigational directions 812 and the distance can be generated from the current precise location 802 of the UE 208 to the nearest point of entry 806 for the first persistent coverage zone 210, and thus, displayed in a GUI via the application. FIG. 8C illustrates an example GUI displayed by an example UE that includes a screenshot of what the subscriber would see on the UE 208. The GUI includes a display generated using real-time data from information retrieved from FIGS. 1-6. The UE 208 may show the map generated in FIG. 8B and includes the current location of the UE 208 and one or more coverage areas, such as the first persistent coverage zone 210 and the second persistent coverage zone 212. In one aspect, only the selected coverage area (i.e., the first persistent coverage zone 210) will be displayed. In other aspects more than one coverage area will be displayed (i.e., the first persistent coverage zone 210 and the second persistent coverage zone 212).

FIG. 8D illustrates a list version of the map generated in FIG. 8B, as displayed in a GUI by an example UE. As corresponding with the visual of FIG. 8B, step 814 tells the subscriber to head north for one mile, step 816 tells the subscriber to turn west, and step 818 tells the subscriber to continue straight (now in the west direction) for 1 mile. This list of steps should get the subscriber to the first persistent coverage zone 210 at the nearest point of entry 806 depicted in FIGS. 8A and 8B.

The present invention has been described in relation to particular aspects, which are intended in all respects to be illustrative rather than restrictive. Further, the present invention is not limited to these aspects, but variations and modifications may be made without departing from the scope of the present invention.

The invention claimed is:

1. A method for determining a distance to a cellular coverage area, the method comprising:
    determining that a user device is at a location that is outside a coverage area provided by a home carrier;
    determining an absence of any roaming carriers to provide coverage to the user device at the location;
    determining a precise location of the user device; and
    using the precise location, determining a distance from the user device to a location where coverage is provided, wherein determining the precise location of the device further comprises using latitude and longitude coordinate pairs on a map, wherein each latitude and longitude coordinate pair forms a vertex of a hexagon.

2. The method of claim 1, wherein the user device utilizes a global positioning system (GPS) to determine the precise location.

3. The method of claim 2, wherein determining the absence of any roaming carriers further comprises scanning a local file on the user device.

4. The method of claim 1, wherein the coverage is provided by the 4. home carrier or the roaming carrier.

5. The method of claim 1, further comprising:

determining that the user device is attempting to make an emergency call;

determining that there are not any emergency-only carriers that can provide coverage to the user device at the location;

determining the precise location of the user device; and using the precise location, determining a distance from the user device to a location where coverage is provided by an emergency-only carrier.

6. The method of claim 1, wherein the map is generated by a network component associated with the home carrier and is stored on the user device.

7. The method of claim 1, wherein the map comprises all of the coverage areas in the United States.

8. The method of claim 1, wherein the user device displays a direction and the distance to a nearest coverage area.

9. The method of claim 1, wherein the user device is capable of communicating using 4G or 5G.

10. A system for determining a distance to a cellular coverage area, the system comprising:

one or more processors; and one or more computer storage hardware devices storing computer-usable instructions, that, when used by the one or more processors, cause the one or more processors to:

determine that a user device is at a location that is outside a coverage area provided by a home carrier;

determine an absence of any roaming carriers to provide coverage to the user device at the location;

determine a precise location of the user device; and using the precise location, determine the distance from the user device to a location where coverage is provided, wherein the instructions further cause the one or more processors to partition telecommunication service data into a plurality of hexagons that represent a plurality of areas within a defined geographic area, each hexagon in the plurality of hexagons being associated with a corresponding data set for a corresponding area within the plurality of areas.

11. The system of claim 10, wherein the coverage comprises one of:

the home carrier, the roaming carrier, or an emergency-only carrier.

12. The system of claim 10, further comprising generating and causing display of a graphical user interface on the user device, the graphical user interface displaying the plurality of hexagons that partition the defined geographic area into the plurality of areas.

13. A method for providing cluster data to a user device for determining a distance from the user device to a cellular coverage area, the method comprising:

receiving telecommunication service data within a defined geographic area;

identifying a first plurality of data sets in the telecommunication service data that correspond to coverage provided by a home carrier;

identifying a second plurality of data sets in the telecommunication service data that correspond to coverage provided by a roaming carrier;

generating a plurality of clusters within the defined geographic area using metrics obtained from the first plurality of data sets and the second plurality of data sets; and sending a map comprising the plurality of clusters to the user device on a telecommunications network, the map comprising the plurality of clusters used by the user device to determine a distance from the user device to a cellular coverage area.

14. The method of claim 13, further comprising generating the map comprising the plurality of clusters.

15. The method of claim 13, wherein the map comprising the plurality of clusters is used by the user device to display a direction and the distance to the cellular coverage area on the user device.

16. The method of claim 15, wherein the cellular coverage area comprises one of: the home carrier, the roaming carrier, or an emergency-only carrier.

17. The method of claim 13, further comprising identifying a third plurality of data sets in the telecommunication service data that correspond to coverage provided by a non-roaming carrier.

18. The method of claim 13, further comprising:

identifying updated data sets in the telecommunication service data that correspond to coverage provided by one or more of the home carrier or the roaming carrier;

generating a plurality of clusters within the defined geographic area using the metrics obtained from the updated data sets;

generating an updated map; and sending the updated map to the user device.

\* \* \* \* \*